United States Patent
Seo et al.

(10) Patent No.: US 10,945,236 B2
(45) Date of Patent: Mar. 9, 2021

(54) METHOD FOR SENSING RESOURCE FOR DIRECT COMMUNICATION BETWEEN TERMINALS IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Seungmin Lee, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/345,349

(22) PCT Filed: Oct. 26, 2017

(86) PCT No.: PCT/KR2017/011889
§ 371 (c)(1),
(2) Date: Apr. 26, 2019

(87) PCT Pub. No.: WO2018/080184
PCT Pub. Date: May 3, 2018

(65) Prior Publication Data
US 2019/0320415 A1 Oct. 17, 2019

Related U.S. Application Data

(60) Provisional application No. 62/419,943, filed on Nov. 9, 2016, provisional application No. 62/412,888, filed on Oct. 26, 2016.

(51) Int. Cl.
*H04W 72/02* (2009.01)
*H04W 76/15* (2018.01)
(Continued)

(52) U.S. Cl.
CPC ....... *H04W 72/02* (2013.01); *H04W 72/0453* (2013.01); *H04W 76/14* (2018.02);
(Continued)

(58) Field of Classification Search
None
See application file for complete search history.

(56) References Cited

U.S. PATENT DOCUMENTS

2015/0382324 A1 12/2015 Sheng et al.
2016/0219620 A1 7/2016 Lee et al.
(Continued)

FOREIGN PATENT DOCUMENTS

WO WO2016165124 10/2016

OTHER PUBLICATIONS

PCT International Search Report and Written Opinion in International Application No. PCT/KR2017/011889, dated Feb. 9, 2018, 18 pages. (with English translation).
(Continued)

*Primary Examiner* — Bunjob Jaroenchonwanit
(74) *Attorney, Agent, or Firm* — Fish & Richardson P.C.

(57) ABSTRACT

The present application provides a method for transmitting or receiving a sidelink signal by a terminal in a wireless communication system. Specifically, the method for transmitting or receiving a sidelink signal comprises the steps of: transmitting a first sidelink signal during a transmission period by using a transmission resource selected among resource units included in a first transmission resource pool; monitoring resource units included in a second transmission resource pool; and transmitting a second sidelink signal during the transmission period by using a selected transmission resource on the basis of a result of the monitoring among the resource units included in the second transmission resource pool when a resource pool changes from the
(Continued)

first transmission resource pool to the second transmission resource pool, wherein the second transmission resource pool is included in a reception resource pool corresponding to the first transmission resource pool.

8 Claims, 10 Drawing Sheets

(51) Int. Cl.
  *H04W 76/14* (2018.01)
  *H04W 72/04* (2009.01)
  *H04W 74/08* (2009.01)
  *H04W 8/00* (2009.01)
  *H04W 92/18* (2009.01)

(52) U.S. Cl.
  CPC ............ *H04W 76/15* (2018.02); *H04W 8/005* (2013.01); *H04W 72/042* (2013.01); *H04W 74/0808* (2013.01); *H04W 92/18* (2013.01)

(56) References Cited

U.S. PATENT DOCUMENTS

| | | |
|---|---|---|
| 2016/0295624 A1 | 10/2016 | Novlan et al. |
| 2016/0302249 A1 | 10/2016 | Sheng |
| 2016/0302251 A1* | 10/2016 | Chatterjee ............. H04L 5/0058 |
| 2017/0245166 A1* | 8/2017 | Bienas ................ H04W 72/085 |
| 2018/0020387 A1* | 1/2018 | Van Der Velde ............................ H04W 36/0072 |
| 2019/0059094 A1* | 2/2019 | Kaur ..................... H04W 76/18 |
| 2019/0059115 A1* | 2/2019 | Uchiyama ......... H04W 74/0841 |
| 2019/0090108 A1* | 3/2019 | Wei ....................... H04W 4/027 |
| 2019/0159073 A1* | 5/2019 | Tang ................... H04W 72/082 |
| 2019/0281526 A1* | 9/2019 | Freda .................... H04W 36/03 |
| 2019/0373647 A1* | 12/2019 | Rugeland ............. H04W 72/04 |
| 2020/0084792 A1* | 3/2020 | Khoryaev ............. H04W 74/04 |

OTHER PUBLICATIONS

Extended European Search Report in European Application No. 17866049.4, dated May 8, 2020, 13 pages.

Sharp, "Further Aspects about D2D Communication Resource Pool Configurations," R2-143652, 3GPP TSG RAN WG2 Meeting #87, Dresden, Germany, dated Aug. 18-22, 2014, 3 pages, XP050819782.

ZTE, "On efficient SA resource monitoring," R2-142148, 3GPP TSG-RAN2#86, Seoul, South Korea, dated May 19-23, 2014, 4 pages, XP050790101.

* cited by examiner

FIG. 2
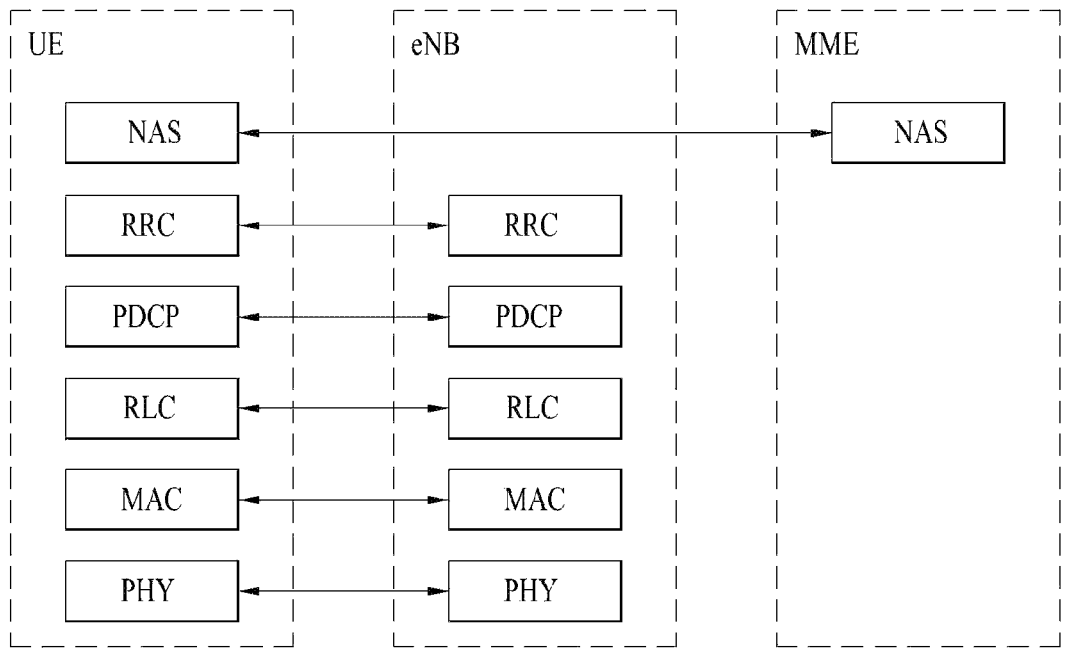
(a) Control-plane protocol stack
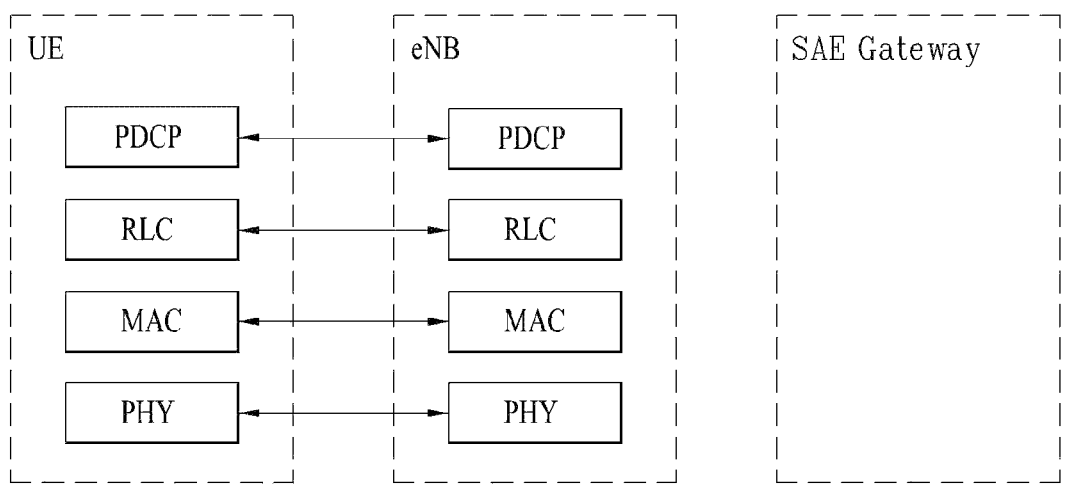
(b) User-plane protocol stack ized as an example of a wireless communication system to which the present invention is applicable.
METHOD FOR SENSING RESOURCE FOR DIRECT COMMUNICATION BETWEEN TERMINALS IN WIRELESS COMMUNICATION SYSTEM AND DEVICE THEREFOR

CROSS-REFERENCE TO RELATED APPLICATIONS

This application is a National Stage application 35 U.S.C. § 371 of International Application No. PCT/KR2017/011889, filed on Oct. 26, 2017, which claims priority under 35 U.S.C. § 119(e) to U.S. Provisional Application No. 62/412,888, filed on Oct. 26, 2016, and U.S. Provisional Application No. 62/419,943, filed on Nov. 9, 2016. The disclosures of the prior applications are incorporated by reference herein in their entirety.

TECHNICAL FIELD

The present disclosure relates to a wireless communication system, and more particularly, to a method of sensing resources for direct communication between terminals in a wireless communication system and device therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above discussion, the present disclosure proposes a method of sensing resources for direct communication between UEs in a wireless communication system and device therefor.

Technical Solution

In an aspect of the present disclosure, provided is a method of transmitting and receiving a sidelink signal by a User Equipment (UE) in a wireless communication system. The method may include: performing first sidelink signal transmission during a transmission period using a transmitting resource selected from among resource units included in a first transmission resource pool; performing monitoring for resource units included in a second transmission resource pool; and when a resource pool is switched from the first transmission resource pool to the second transmission resource pool, performing second sidelink signal transmission during the transmission period using a transmission resource selected based on a monitoring result from among the resource units included in the second transmission resource pool. In this case, the second transmission resource pool may be included in a reception resource pool corresponding to the first transmission resource pool.

Preferably, performing the monitoring may include measuring reception energy for the resource units in the resource set, and performing the second sidelink signal transmission may include selecting at least one resource unit in the second transmission resource pool of which measured reception energy is equal to or lower than a threshold as the transmission resource for the second sidelink signal transmission.

Preferably, performing the first sidelink signal transmission may include transmitting a first sidelink control signal, and the first sidelink control signal may include information on the transmission resource selected from the first transmission resource pool, which is allocated for the first sidelink signal transmission during the transmission period.

Additionally, when the second transmission resource pool is not included in the reception resource pool, performing the second sidelink signal transmission may include randomly selecting at least one of the resource units included in the second transmission resource pool; and performing the second sidelink signal transmission using the selected at least one resource unit.

Further, performing the monitoring may include performing sidelink signal reception based on the reception resource pool.

In another aspect of the present disclosure, provided is a User Equipment (UE) in a wireless communication system. The UE may include: a wireless communication module; and a processor connected to the wireless communication mode. The processor may be configured to perform first sidelink signal transmission during a transmission period using a transmitting resource selected from among resource units included in a first transmission resource pool and perform monitoring for resource units included in a second transmission resource pool. In addition, when a resource pool is switched from the first transmission resource pool to the second transmission resource pool, the processor may be configured to perform second sidelink signal transmission during the transmission period using a transmission resource selected based on a monitoring result from among the resource units included in the second transmission resource pool. In this case, the second transmission resource pool may be included in a reception resource pool corresponding to the first transmission resource pool.

Preferably, the processor may be configured to measure reception energy for the resource units in the resource set when performing the monitoring and select at least one resource unit in the second transmission resource pool of which measured reception energy is equal to or lower than a threshold as the transmission resource for the second sidelink signal transmission.

Preferably, the processor is configured to transmit a first sidelink control signal for the first sidelink signal transmission, and the first sidelink control signal may include information on the transmission resource selected from the first transmission resource pool, which is allocated for the first sidelink signal transmission during the transmission period.

Additionally, when the second transmission resource pool is not included in the reception resource pool, the processor may be configured to randomly select at least one of the resource units included in the second transmission resource pool and perform the second sidelink signal transmission using the selected at least one resource unit.

Further, the processor may be configured to perform sidelink signal reception based on the reception resource pool while performing the monitoring.

Advantageous Effects

According to the present disclosure, resource sensing and resource allocation for direct communication between UEs can be efficiently performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE FOR INVENTION

Figure 1:
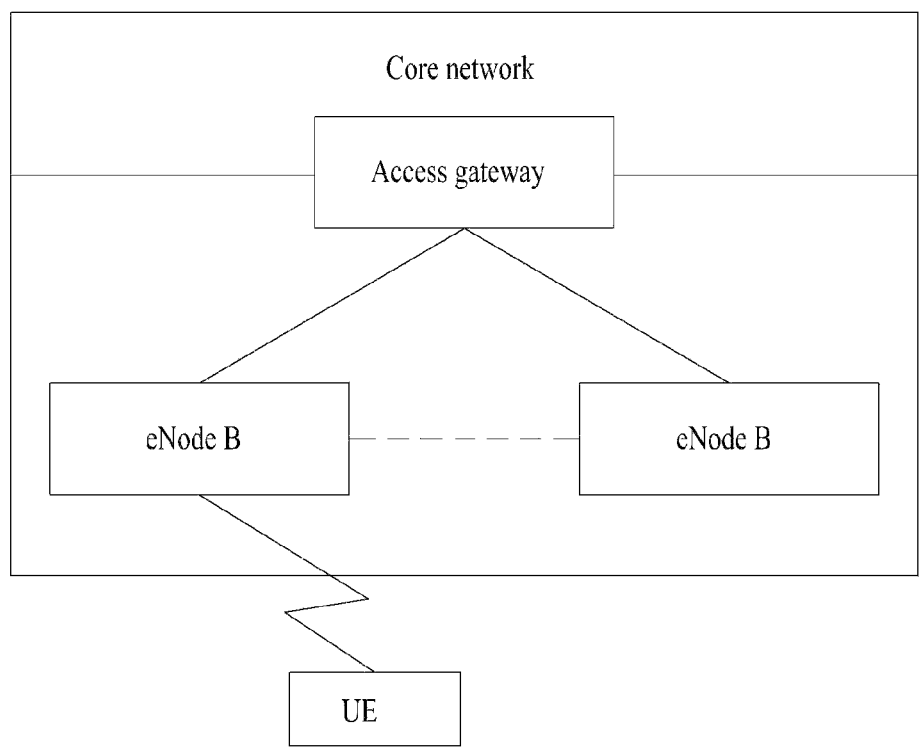
FIG. 1 is a diagram schematically illustrating a network structure of an E-UMTS as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LIE-A) system, the LTE system and the LIE-A system are purely exemplary and the embodiments of the present invention can be applied to any communication system corresponding to the aforementioned definition. Moreover, although the present specification describes an embodiment of the present invention with reference to FDD system, this is just exemplary. And, the embodiments of the present invention can be applied to H-FDD or TDD system by being easily modified.

In the present disclosure, a base station (eNB) may be used as a broad meaning including a remote radio head (RRH), an eNB, a transmission point (IR), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
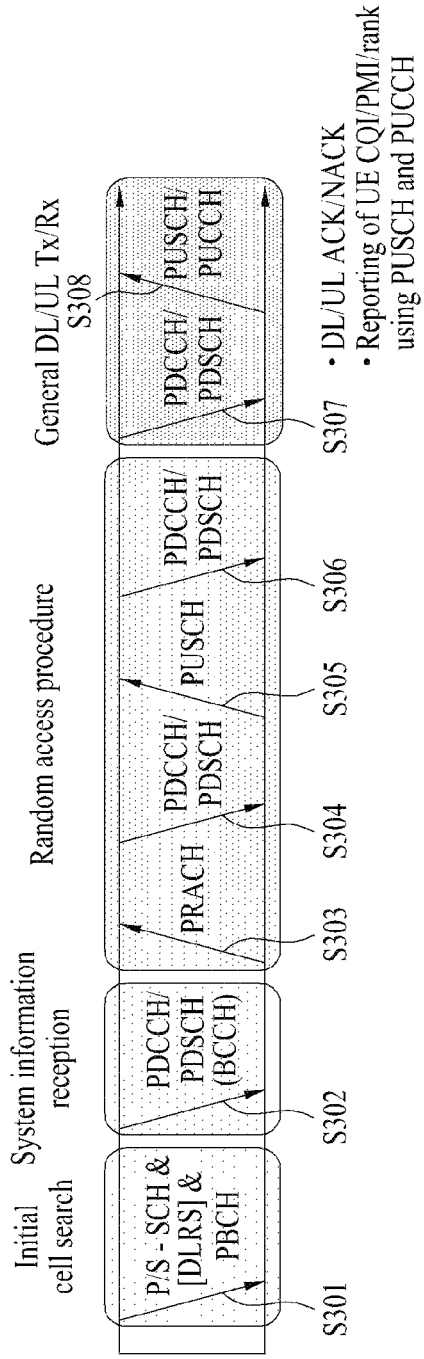
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the LIE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRAM) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
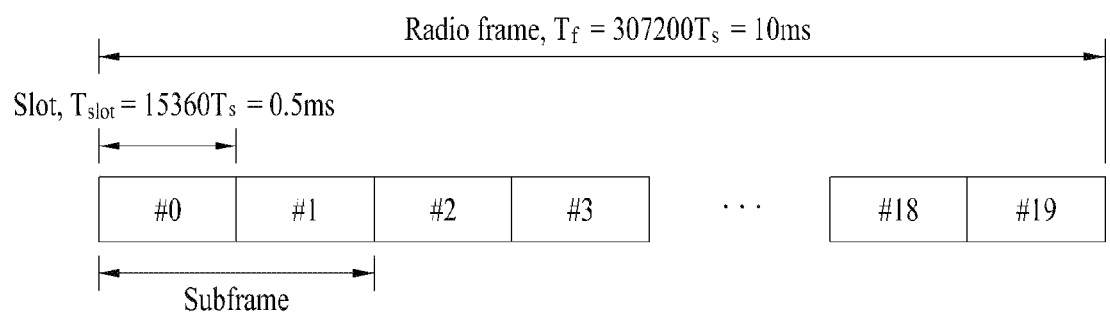
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
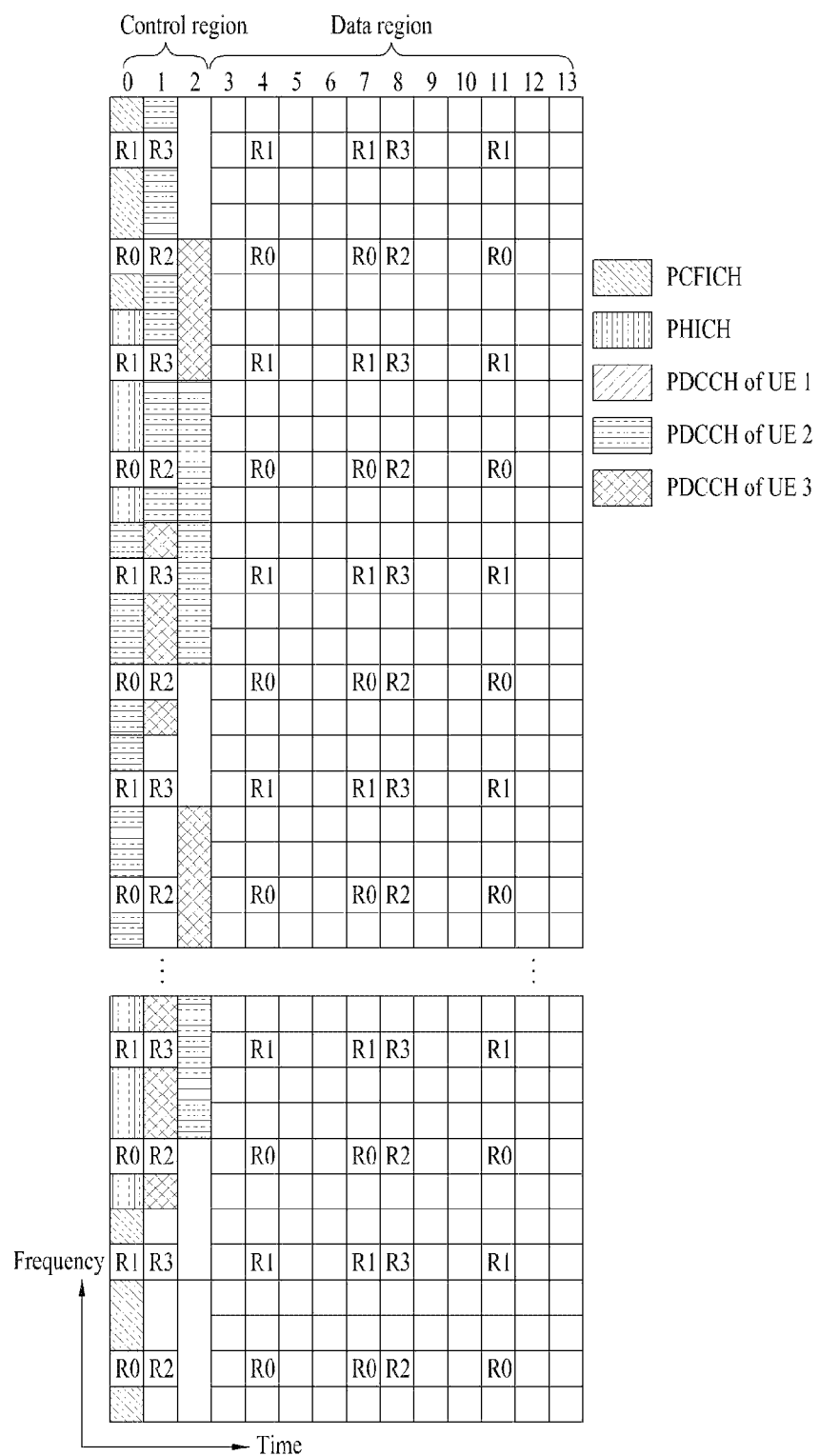
FIG. 5 is a diagram illustrating the structure of a UL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID, One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
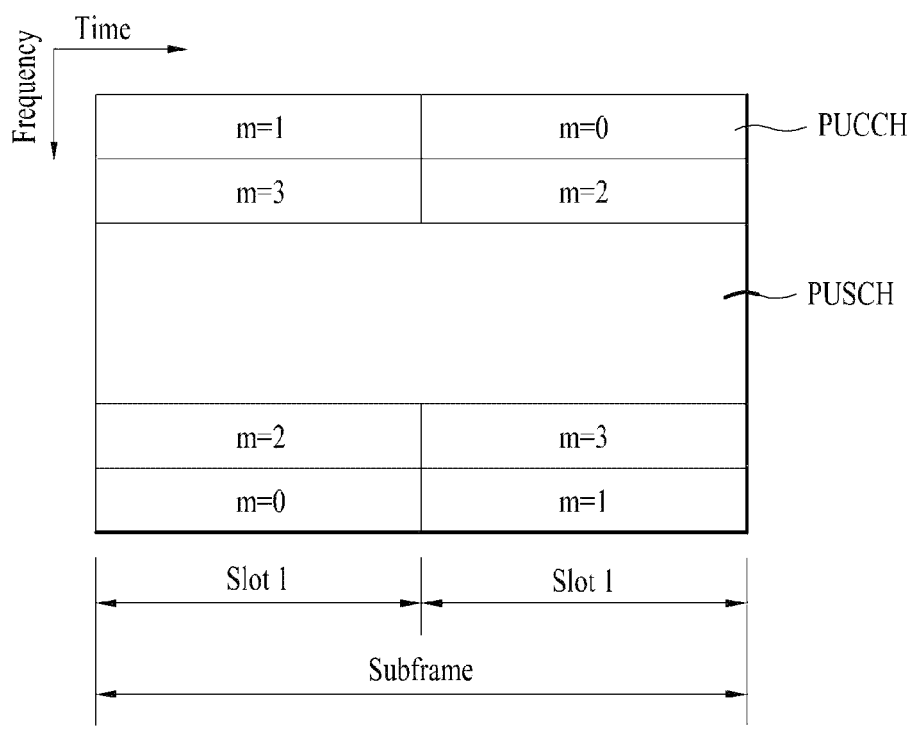
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
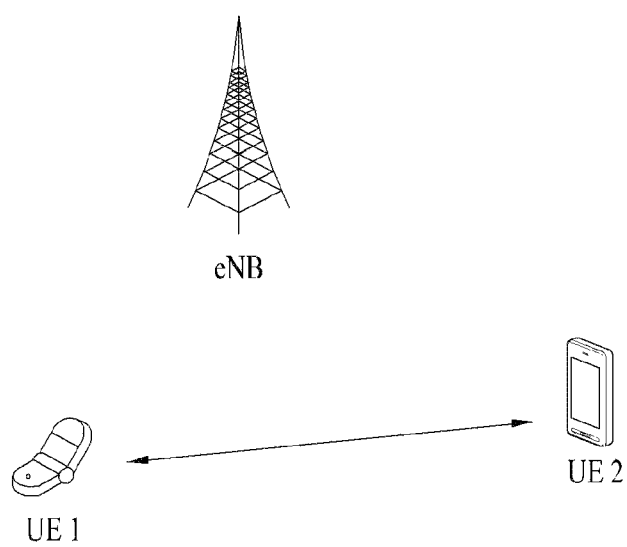
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which a UE wirelessly communicates with another UE, art eNB may transmit a scheduling message for indicating D2D transmission/reception. In the following description, a direct link established between UEs for direct communication therebetween, i.e., a D2D link is referred to as a Sidelink (SL) as the concept opposite to an uplink and a downlink.

A UE participating in sidelink communication receives a sidelink scheduling message from an eNB and perform transmission and reception operation indicated by the sidelink scheduling message. Here, although a UE means a user terminal, a network entity such as an eNB can be regarded as kind of a UE if the network entity transmits/receives signals according to a communication scheme between UEs. In addition, an eNB can receive a sidelink signal transmitted from a UE, and a UE can use a signal transmission and reception method designed for sidelink communication between UEs to transmit an uplink signal to an eNB.

For sidelink communication, a UE performs a discovery process for determining whether a peer UE, which the UE desires to communicate with, is in an adjacent area where the sidelink communication is possible. The discovery process is performed as follows. First, a UE transmits a unique discovery signal that allows other UEs to identify the corresponding UE. By detecting the discovery signal, a neighboring UE can recognize that the UE transmitting the discovery signal is located in the vicinity thereof. That is, after checking whether a peer UE corresponding to a sidelink communication target is located in the vicinity thereof through the discovery process, each UE performs sidelink communication, that is, transmits and receives user data to and from the peer UE.

Meanwhile, described in the following is a case that UE 1 selects a resource unit corresponding to a specific resource from a resource pool that means a set of a series of resources and then transmits a sidelink signal using the corresponding resource unit. Here, if UE 1 is located in a coverage of a base station, the base station may inform UE 1 of the resource pool. If UE 1 is out of the coverage of the base station, the resource pool may be indicated by another UE or determined as a resource determined in advance. Generally, a resource pool is configured with a plurality of resource units and each UE may select and use one or a plurality of resource units for a sidelink signal transmission of its own.

Figure 8:
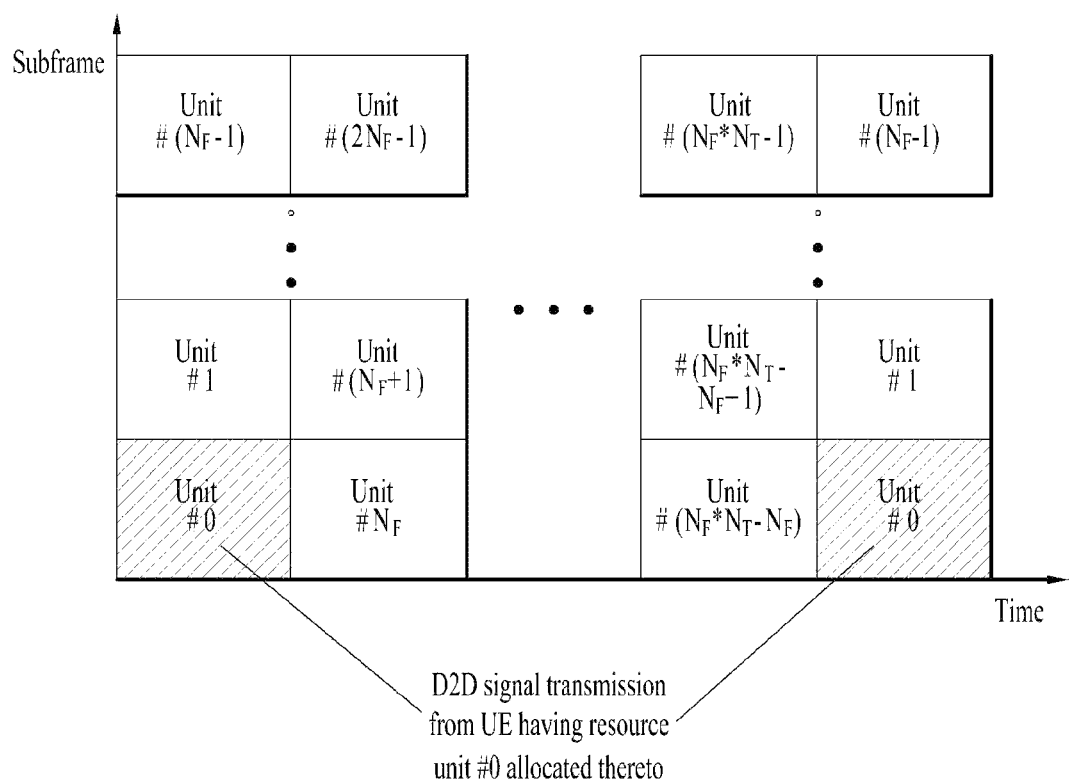
FIG. 8 illustrates an exemplary configuration of a resource pool and a resource unit.

FIG. 8 shows a configurational example of a resource pool and a resource unit.

Referring to FIG. 8, an entire frequency resource is divided into NF and an entire time resource is divided into NT, whereby total NF*NT resource units are defined for example. Particularly, a corresponding resource pool may be repeated by period of NT subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time, in such a resource unit structure, a resource pool may mean a set of resource units that can be used for a transmission by a UE intending to transmit a sidelink signal.

A resource pool can be subdivided into various types. First of all, a resource pool can be classified according to the content of a sidelink signal transmitted therein. For example, a sidelink signal may contain the following content: a scheduling assignment, a sidelink data channel, and a discovery signal, which will be described in detail in 1) to 3) below, and a separate resource pool may be configured depending on the content.

1) SA (Scheduling assignment): An SA refers to a signal including resource location information of a sidelink data channel, information on a Modulation and Coding Scheme (MCS) for demodulation of the sidelink data channel, information on a MIMO transmission scheme, etc., which is provided by a transmitting UE. The SA can be multiplexed with sidelink data and then transmitted together with the sidelink data on the same resource unit. In this case, an SA resource pool may mean a resource pool in which the SA is multiplexed and transmitted with the sidelink data.

2) Sidelink data channel: This refers to a channel used for a Tx UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a Tx UE in such a manner that the Tx UE transmits information such as its own ID and the like.

4) Synchronization signal: A transmitting UE transmits a synchronization signal and information on synchronization so that a receiving UE can achieve time/frequency synchronization with the transmitting UE. In this case, it could be interpreted to mean a resource pool for the signal/channel used by the receiving UE to achieve the time/frequency synchronization.

First Embodiment

To transmit a sidelink signal, a UE can autonomously select appropriate resources from a resource pool and determine the selected resources as transmission resources. This type of transmission is effective, in particular, when there is no device for allocating resources such as an eNB. However, when a UE autonomously determines sidelink transmission resources, there may occur a problem that another UE selects the same resources. This is called a resource collision. When the resource collision occurs, performance may be degraded due to interference between sidelink signals. Thus, a method of avoiding the resource collision or a method of reducing the effects of the resource collision is required.

As a method of avoiding a resource collision, it may be considered that a UE reads Resource Allocation (RA) information of a different UE and avoids use of resources that will be used by the different UE. This method is effective, in particular, when a UE transmits a control signal including RA information using some time/frequency resources before transmitting sidelink data. To avoid such a resource collision, a UE should monitor a control signal from another UE during a predetermined time. That is, assuming that a UE is able to indicate transmission resources up to subframe #(n+K) using a control signal transmitted in subframe #n, the UE should monitor RA information of another UE over all the subframes starting from the SF #n in order to completely avoid a resource collision and start transmission at SF #(n+K). In this case, a period in which a UE should monitor a control signal from another UE to avoid a resource collision can be referred to as an RA monitoring window.

In addition, even if a UE fails to monitor RA of a different UE, the UE can check whether the different UE performs transmission. To this end, the UE may measure reception energy for each resource within an RA monitoring window and if there is a resource of which the energy is higher than a predetermined threshold, consider that the corresponding resource is occupied by the different UE. On the contrary, if there is a resource of which the energy is lower than the predetermined threshold, the UE may regard the corresponding resource as an available resource. Although the above operation can reduce the resource collision probability, a UE should perform monitoring during a predetermined time to transmit data once. Such monitoring is called sensing.

In the above-described operation of determining sidelink resources based on monitoring, if a UE fails to perform monitoring, there may occur a problem that the UE cannot select appropriate resources. In this case, if the UE stops transmission until completing the monitoring, a sidelink message transmission time significantly increases so that service requirements for time delay cannot be satisfied. Such a problem may occur in particular when a transmission resource pool to be used by a UE is changed.

For example, while a UE performs transmission in pool A, the UE monitors pool A. If the transmission resource pool is switched to pool B at a specific time t, the above-described problem may occur since the UE has no monitoring information on pool B. Specifically, in the case of handover where a UE changes its serving cell, the UE may switch from pool A, which corresponds to the resource pool of a source cell, to pool B, which corresponds to the resource pool of a target cell. Alternatively, to adjust interference caused by geographical locations, a UE may use pool A at a specific location and switch to pool B when the UE moves to a different location.

To reduce resource collisions in a situation that the resource pool is changed while maintaining monitoring, a UE needs to monitor a resource pool, which is expected to become a future transmission resource pool, in advance. However, in this case, since the UE should simultaneously monitor a plurality of resource pool, this operation may significantly increase UE implementation complexity. Meanwhile, considering that a UE should perform reception even in other resource pools except its transmission resource pool, when completing the reception, the UE can obtain the same effect as when the UE performs monitoring for resource determination.

Specifically, in a reception pool, a UE demodulates a sidelink control channel transmitted from a different UE and performs channel estimation of a sidelink shared channel based on the demodulated sidelink control channel. Thus, while performing the reception operation, the UE can obtain sidelink control information from the different UE (for example locations of resources for data transmitted from the different UE, priority thereof, information on future resource use, etc.), which is expected to be obtained during the monitoring operation. In addition, the UE may use the DM-RS received power of the sidelink shared channel of the different UE during the monitoring operation. In this case, the UE may exclude a resource with high DM-RS received power from resource selection in order to avoid a collision with the corresponding UE. Such information can be naturally obtained during the channel estimation process for receiving the sidelink shared channel as well.

Additionally, the UE may also measure energy of each time/frequency resource during the monitoring operation. Here, the UE may exclude a resource of which the energy is higher than a predetermined threshold and regard a resource of which the energy is lower than the predetermined threshold as an available resource. Since this is an operation of simply measuring the signal level of a frequency resource, the UE can compute the energy by performing the Fast Fourier Transform (FFT) operation during the reception process.

Therefore, the present disclosure proposes that a UE performs monitoring for a future transmission resource pool in advance only when the monitoring of the further transmission resource pool can be guaranteed or supported by supported by a UE's current reception operation.

For example, a UE further obtains configuration information of a potential future transmission resource pool from a currently used transmission resource pool. In addition, if a part of the potential future transmission resource pool is included in a currently used reception resource pool, the UE monitors the corresponding part. Of course, in this case, it should be premised that sensing results of the reception resource pool are stored.

When it is said that a specific transmission resource pool is included in a specific reception resource pool, it may mean that while the two resource pools have the same synchronization reference or common elements, the time/frequency resources of the transmission resource pool is a subset of the time/frequency resources of the reception resource pool. In addition, a condition that various parameters, for example, a CP length, subcarrier spacing, a Transmission Time Interval (TTI) length, the amount of basic frequency resources (or the size of a sub-channel) and/or boundaries (i.e., start and end points) should be the same may be added.

As another example, instead of obtaining configuration information of a potential future transmission resource pool separately, a UE may collect and store various information for monitoring in advance by assuming that a random subset of a currently used reception resource pool will become a future transmission resource pool. The information may include sidelink control channel information of a different UE detected in each reception resource pool (particularly, resource allocation information, priority information, and information on future resource use), DM-RS received power of a sidelink shared channel of the different UE, energy measured per time/frequency resource, etc. In addition, if a new transmission resource pool is set as a subset of a specific reception resource pool, the UE may obtain information, which is expected to be obtained from monitoring, using part of the previously stored information, which corresponds to the new transmission resource pool. Based on the information, the UE may perform the monitoring-based resource selection operation immediately. Of course, a limitation that many parameters including synchronization reference should be the same can be added for the above operation.

When a UE has no monitoring result due to failure in satisfying the above-described condition even though the UE is configured with a new transmission resource pool, the UE may operate in a different way. For example, the UE may transmit an urgent message by selecting random resources without monitoring. By configuring a separate transmission resource pool for the above operation, it is possible to prevent interference caused by the random selection from affecting other normal monitoring operations.

Figure 9:
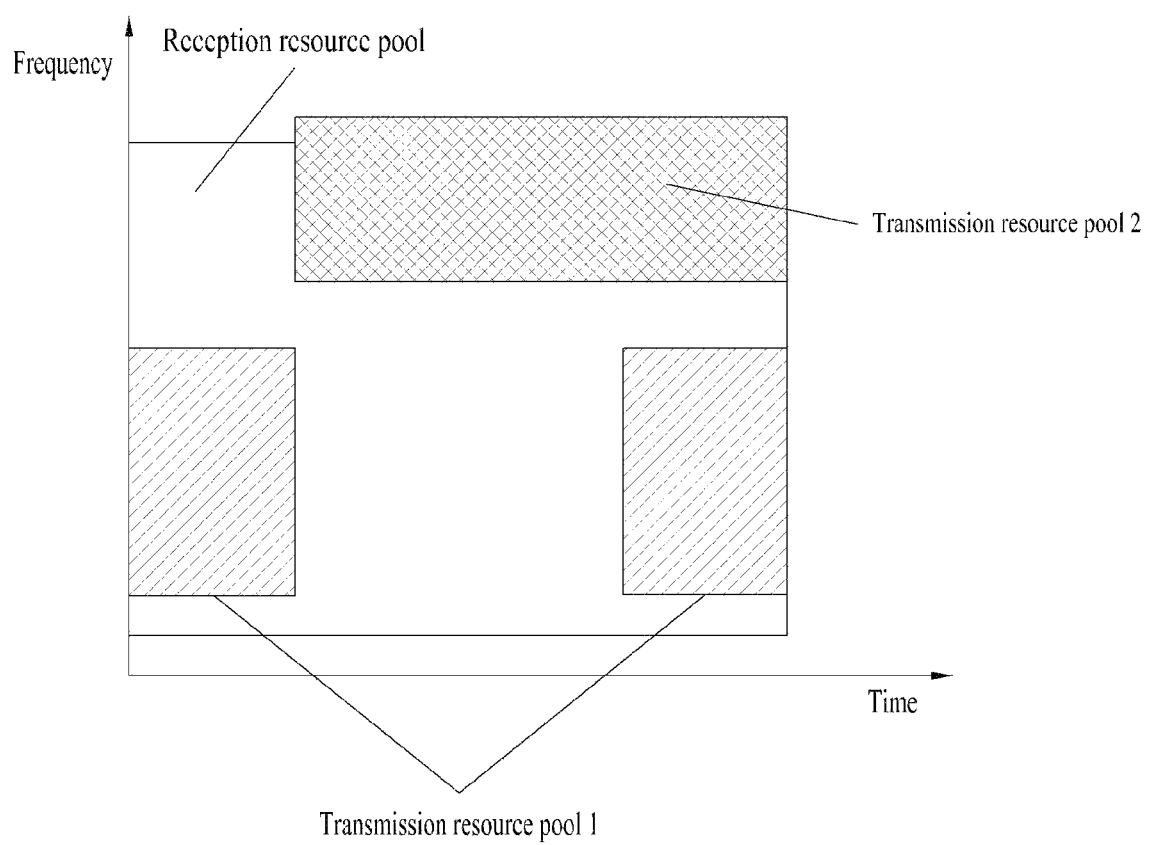
FIG. 9 is a diagram illustrating a method of selecting resources based on monitoring according to an embodiment of the present disclosure.

FIG. 9 is a diagram illustrating a method of selecting resources based on monitoring according to an embodiment of the present disclosure.

Referring to FIG. 9, when a UE is configured with a reception resource pool, if transmission resource pool candidate 1 becomes an actual transmission resource pool, the UE may immediately select resources based on monitoring as described above since transmission resource pool candidate 1 is included in the reception resource pool. On the other hand, since transmission resource pool candidate 2 is not included in the reception resource pool, there is no monitoring result. Thus, if it becomes an actual transmission resource pool, the UE may attempt resource allocation without performing monitoring in order to satisfy the latency requirements.

However, if some resources are included in the existing reception resource pool as in transmission resource pool candidate 2 of FIG. 9, the UE may be configured to select only resources that the UE can monitor because the resources are included in the reception resource pool until the UE becomes able to monitor all resources, instead of regarding that there is no monitoring. By doing so, even if a resource pool is switched to a partially overlapping transmission resource pool, it is possible to secure minimum resources that can be selected through monitoring.

Second Embodiment

Meanwhile, when monitoring for a future transmission resource pool is performed using a reception resource pool, signaling overhead can be reduced by performing an operation of receiving sidelink packets and an operation of collecting sensing information for future transmission together, whereas the flexibility of separating the operations is degraded.

As an alternative, a UE may be configured with a measurement resource pool, which is different from transmission and reception resource pools. The UE does not perform transmission or reception in the measurement resource pool but performs monitoring or measurement, for example, an operation of measuring a congestion level, which will be described later. In this case, the measurement resource pool can be applied as reference for determining availability of monitoring results. That is, when the UE is configured with a new transmission resource pool, if the corresponding resource pool is included in the measurement resource pool during a sufficient time, the UE may determine that monitoring results are valid and then perform resource selection based on the monitoring results. On the contrary, if the new transmission resource pool is not included in the measurement resource pool during the sufficient time, the UE may perform separate resource selection without the monitoring.

The above description can be applied not only when a UE performs monitoring to select resources but also when a UE measures information on a resource pool, for example, how the corresponding resource pool is congested. For instance, a metric for measuring a congestion level may be defined. In this case, a UE may measure energy of unit resources in a resource pool, and if the amount of measured energy is higher than a predetermined value, calculate a ratio between the number of resources expected to be used by another UE and the total number of unit resources in the resource pool. Thereafter, the UE can operate properly depending on the results thereof.

The above operation can be applied when the congestion level of a future transmission resource pool is measured. For example, it is assumed that a UE needs to measure the congestion level of a specific transmission resource pool before starting transmission in the corresponding resource pool and adjust its transmission operation by reflecting the measured congestion level. Even in this case, the transmission resource pool may be changed. However, if the changed transmission resource pool is included in a reception resource pool, the UE can perform transmission immediately.

When the transmission resource pool is changed during the above-described congestion control process, the adjustment of the transmission operation, which depends on measurement values of the congestion metric, may also be changed. As a method of controlling a congestion level, the amount of resources used by a UE for transmission during a predetermined time period may be regulated to be less than the upper limit of the amount of resource use, which is deduced from a measured congestion level. In this case, if the transmission resource pool is changed, the UE should exclude the amount of resources used in the previous pool when calculating the total amount of used resources. In other words, when the transmission resource pool is changed, the UE may reset the amount of resources used so far and operate not to exceed a given upper limit while recoding the amount of currently used resources.

For example, it is assumed that a UE is configured to use up to 100 RBs during one second in a resource pool but after the resource pool is changed, the UE is configured to use up to 50 RBs during one second. If the UE used 10 RBs every 100 ms in the previous resource pool, it is anticipated that the UE already used 100 RBs during the last one second immediately after the transmission resource pool was changed. Thus, even if the UE performs no transmission during 500 ms, the UE cannot use more resources since the UE used all 50 RBs during the last one second. According to the present disclosure, when the transmission resource pool is changed, the UE resets the previously used resources and then starts to use 50 RBs every one second. Accordingly, the UE performs transmission using 5 RBs every 100 ms.

The above operation can be applied not only when a transmission resource pool is changed but also when a congestion metric is changed even though the same resource pool is used. In other words, if the measurement value of a congestion metric is changed, a UE may be able to use more or less resources than before. In this case, the UE resets the previous resource-use history and determines the amount of resource use based on a newly calculated resource use limit.

However, when the measurement value of the congestion metric is changed while the UE reserves a series of resources, if the UE reflects the change in the measurement value immediately, the UE may fail to maintain the reserved resources. In addition, this failure may disturb other UEs which operate based thereon in selecting their resources. Therefore, when the measurement value of the congestion metric is changed and the amount/frequency of resources that can be used by the UE is also changed due to the change in the measurement value, the UE may be configured to use the previously reserved resources.

Specifically, when a UE selects a resource, the UE uses the corresponding resource a predetermined number of times with a predetermined period. When selecting the resource, the UE sets a counter by selecting a random value within a predetermined range and decreases the counter by 1 whenever using the resource for transmission. If the counter reaches zero, the UE may regard that the corresponding resource is all used. In other words, the UE may set the number of times of using the corresponding resource equal to the value of the counter.

Additionally, before completely using the reserved resource, the UE may determine whether to reserve the corresponding resource again with a certain probability. If the UE determines to reserve the corresponding resource again, the UE does not select another resource even though the counter becomes zero but can reserve the same resource as many times as a randomly selected counter. If during this operation, the measurement value of a congestion metric is changed and the amount/frequency of resources that can be used by the UE is also changed due to the change in the measurement value, the UE continues to use the corresponding resource until the current counter reaches zero. However, the UE skips the process for determining whether to reserve the same resource at the certain probability. When the counter reaches zero, the UE may be configured to select a new resource according to the new restriction on the amount/frequency of resources.

Alternatively, the UE performs the operation of reserving the same resource at the certain probability in the same way as described above, but when selecting a new resource, the UE may perform the resource selection according to the new restriction. In this case, how the UE operates may depend on whether the congestion level increases or decreases. This is because since more resources can be used when the congestion level decreases, maintaining the current resource as long as possible is not against the congestion control as well as can avoid a resource collision, whereas when the congestion level increases, the UE needs to reduce interference to other UEs by reducing the amount of resources as soon as possible. For example, when the congestion level increases, the UE may immediately reselect a resource regardless of the counter. Alternatively, when the congestion level increases, the UE may maintain the current resource until the counter reaches zero but skip the process for determining whether to reserve the same resource at the certain probability.

The above operation can be applied only when a change in the amount of resources that can be used by the UE is higher than a predetermined level due to a significant change in the congestion level. For example, the UE may be configured to maintain the current resource when a change in the congestion level is level 1 (or when a change in the Channel Busy Ratio (CBR) is equal to or less than a predetermined level) but select a new resource as described above when the change in the congestion level is level 2 or higher (or when the change in the CBR is equal to or more than the predetermined level). Therefore, it is possible to prevent a resource reservation from being cancelled in spite of a small change in the CBR.

Meanwhile, when the amount of resource use needs to be reduced due to an increase in the congestion level, the UE may be configured to continue to use the currently reserved resources but perform actual transmission on some of the resources, thereby reducing the amount of resource use. Although other UEs may assume that the transmission is performed on all of the reserved resources, performance degradation caused by a high congestion level can be mitigated since interference occurs on smaller resources.

However, transmission power may be exceptionally dealt with during the above operation. Since the transmission power is a parameter that can be changed anytime regardless of resource reservations, a UE may be configured to adjust the transmission power by immediately reflecting the change in the congestion level.

Figure 10:
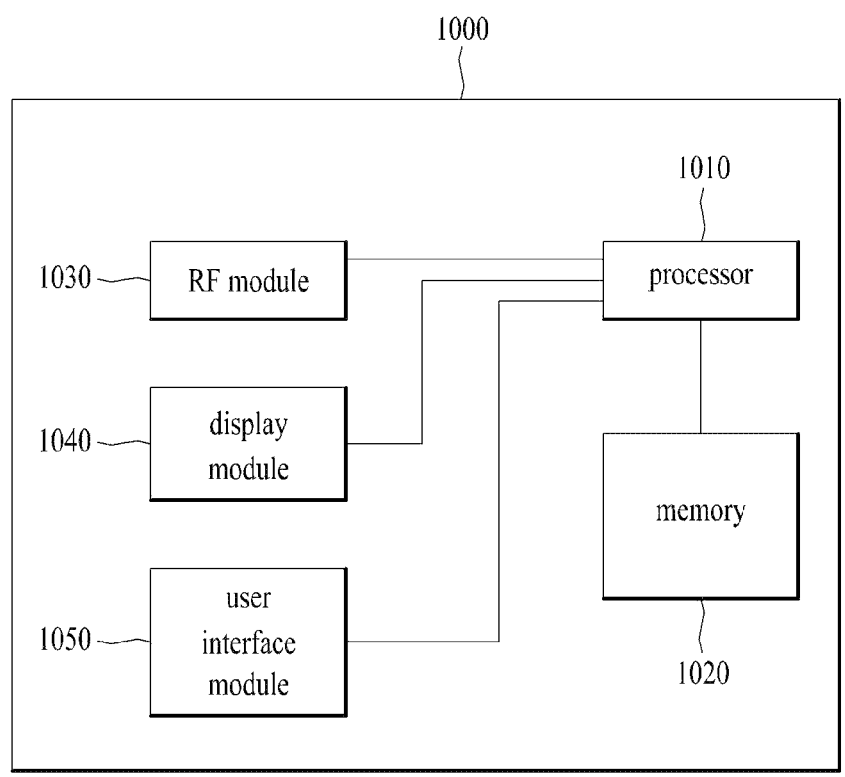
FIG. 10 is a block diagram illustrating a communication device according to an embodiment of the present disclosure.

FIG. 10 is a block diagram illustrating a communication device according to an embodiment of the present disclosure.

Referring to FIG. 10, a communication device 1000 may include a processor 1010, a memory 1020, a Radio Frequency (RF) module 1030, a display module 1040, and a user interface module 1050.

Since the communication device 1000 is illustrated for convenience of description, some of the modules may be omitted. If necessary, other modules may be further included in the communication device 1000. In some cases, some modules may be divided into sub-modules. The processor 1010 may be configured to perform the operations in accordance with the embodiments of the present invention, which are illustrated with the accompanying drawings. The operations of the processor 1010 are described in detail above with reference to FIGS. 1 to 9.

The memory 1020 is connected to the processor 1010 and stores operating systems, applications, program codes, data, etc. The RF module 1030 is connected to the processor 1010 and converts a baseband signal into a radio signal or vice versa. To this end, the RF module 1030 performs analog conversion, amplification, filtering, and frequency up-conversion, or inverse procedures thereof. The display module 1040 is connected to the processor 1010 and displays various information. The display module 1040 may be implemented using well-known elements such as a Liquid Crystal Display (LCD), a Light Emitting Diode (LED), and an Organic Light Emitting Diode (OLED). However, it is not limited thereto. The user interface module 1050 is connected to the processor 1010 and may be implemented by combining well-known user interfaces such as a keypad, a touchscreen. etc.

Figure 11:
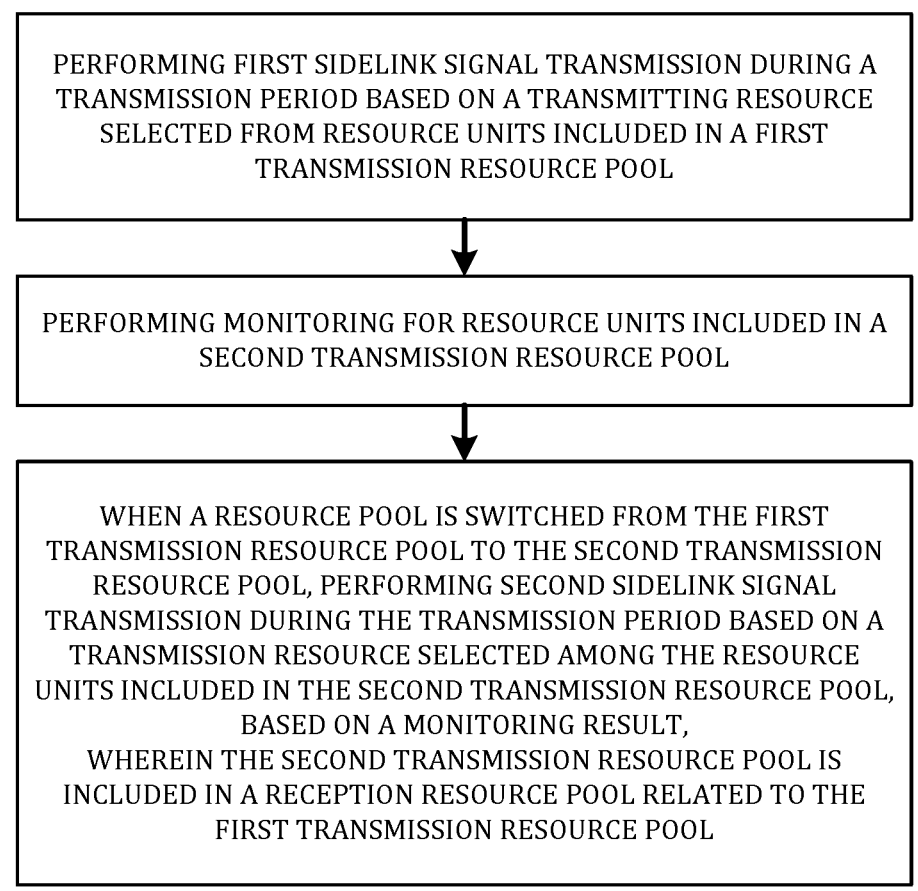
FIG. 11 is a flow chart illustrating an example of transmitting and receiving a sidelink signal by a User Equipment (UE) in a wireless communication system.

FIG. 11 is a flow chart illustrating an example of transmitting and receiving a sidelink signal by a User Equipment (UE) in a wireless communication system.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for pert the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made therein without departing from the spirit and scope of the invention. Therefore, the detailed description should not be interpreted restrictively in all aspects but considered as exemplary. Thus, it is intended that the present invention covers the modifications and variations of this invention that come within the scope of the appended claims and their equivalents.

INDUSTRIAL APPLICABILITY

Although the aforementioned method of configuring a resource for Device-to-Device (D2D) direct communication in a wireless communication system and apparatus therefor are described by focusing on examples applying to the 3GPP LTE system, they are applicable to various wireless communication systems as well as to the 3GPP LTE system.

What is claimed is:

1. A method of transmitting and receiving a sidelink signal by a User Equipment, UE, in a wireless communication system, the method comprising:
performing first sidelink signal transmission during a transmission period based on a transmitting resource selected from resource units included in a first transmission resource pool;
performing monitoring for resource units included in a second transmission resource pool; and
based on a resource pool being switched from the first transmission resource pool to the second transmission resource pool, performing second sidelink signal transmission during the transmission period based on a transmission resource selected among the resource units included in the second transmission resource pool, based on a result of the performed monitoring,
wherein the second transmission resource pool is included in a reception resource pool related to the first transmission resource pool,
wherein pre-configured information is obtained for the performing of the monitoring based on the second transmission resource pool being included in the reception resource pool,
wherein the pre-configured information includes first information regarding resource allocation of other UE and second information regarding received power of demodulation reference signal (DMRS) for data of the other UE,
wherein the pre-configured information is used based on cyclic prefix (CP) length and subcarrier spacing (SCS) of the second transmission resource pool being same as CP length and SCS of the reception resource pool,
wherein a resource unit included in a third transmission resource pool is randomly selected for the performing of the second sidelink signal transmission, based on the CP length and the SCS of the second transmission resource pool being different from the CP length and the SCS of the reception resource pool, and wherein the third transmission resource pool is a transmission resource pool different from the second transmission resource pool.

2. The method of claim 1, wherein performing the monitoring includes measuring reception energy for the resource units in the resource set, wherein performing the second sidelink signal transmission includes selecting at least one resource unit, among the resource units included in the second transmission resource pool, and wherein the measured reception energy of which are equal to or smaller than a threshold, as the transmission resource for the second sidelink signal transmission.

3. The method of claim 1, wherein performing the first sidelink signal transmission includes transmitting a first sidelink control signal, and wherein the first sidelink control signal includes information regarding the transmission resource selected from the first transmission resource pool, which is allocated for the first sidelink signal transmission during the transmission period.

4. The method of claim 1, wherein performing the monitoring includes performing sidelink signal reception based on the reception resource pool.

5. A User Equipment (UE) configured to operate in a wireless communication system, the UE comprising:
a wireless communication module; and
a processor connected to the wireless communication module,
wherein the processor is configured to:
perform first sidelink signal transmission during a transmission period based on a transmitting resource selected from resource units included in a first transmission resource pool;
perform monitoring for resource units included in a second transmission resource pool, and
based on a resource pool being switched from the first transmission resource pool to the second transmission resource pool, perform second sidelink signal transmission during the transmission period based on a transmission resource selected among the resource units included in the second transmission resource pool, based on a result of the performed monitoring, wherein the second transmission resource pool is included in a reception resource pool related to the first transmission resource pool, wherein pre-configured information is obtained for the monitoring performance based on the second transmission resource pool being included in the reception resource pool, wherein the pre-configured information includes first information regarding resource allocation of other UE and second information regarding received power of demodulation reference signal (DMRS) for data of the other UE, wherein the pre-configured information is used based on cyclic prefix (CP) length and subcarrier spacing (SCS) of the second transmission resource pool being same as CP length and SCS of the reception resource pool, wherein a resource unit included in a third transmission resource pool is randomly selected for the performing of the second sidelink signal transmission, based on the CP length and the SCS of the second transmission resource pool being different from the CP length and the SCS of the reception resource pool, and wherein the third transmission resource pool is a transmission resource pool different from the second transmission resource pool.

6. The UE of claim 5, wherein the processor is configured to:
measure reception energy for the resource units in the resource set when performing the monitoring, and
select at least one resource unit, among the resource units included in the second transmission resource pool,
wherein the measured reception energy of which are equal to or smaller than a threshold, as the transmission resource for the second sidelink signal transmission.

7. The UE of claim 5, wherein the processor is configured to transmit a first sidelink control signal for the first sidelink signal transmission, and
wherein the first sidelink control signal includes information regarding the transmission resource selected from the first transmission resource pool, which is allocated for the first sidelink signal transmission during the transmission period.

8. The UE of claim 5, wherein the processor is configured to perform sidelink signal reception based on the reception resource pool while performing the monitoring.

* * * * *